(12) United States Patent
Puura

(10) Patent No.: US 9,241,265 B2
(45) Date of Patent: Jan. 19, 2016

(54) METHOD AND APPARATUS FOR HANDLING INCOMING STATUS MESSAGES

(75) Inventor: Sami Mikael Puura, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 987 days.

(21) Appl. No.: 13/107,669

(22) Filed: May 13, 2011

(65) Prior Publication Data

US 2012/0289191 A1 Nov. 15, 2012

(51) Int. Cl.

| | |
|---|---|
| *H04W 12/06* | (2009.01) |
| *G06Q 30/06* | (2012.01) |
| *H04L 12/58* | (2006.01) |
| *H04W 4/20* | (2009.01) |
| *H04W 4/14* | (2009.01) |

(52) U.S. Cl.
CPC .............. *H04W 12/06* (2013.01); *G06Q 30/06* (2013.01); *H04L 51/38* (2013.01); *H04W 4/14* (2013.01); *H04W 4/20* (2013.01)

(58) Field of Classification Search
CPC ......... H04W 12/06; H04W 4/14; H04W 4/20; G06Q 30/06; H04L 51/38
USPC ................ 455/410–411, 412.1–412.2, 414.2, 455/418–420, 466
See application file for complete search history.

(56) References Cited

U.S. PATENT DOCUMENTS

| | | | |
|---|---|---|---|
| 7,966,027 B1* | 6/2011 | Dudziak et al. ............... | 455/466 |
| 2005/0125342 A1 | 6/2005 | Schiff | |
| 2006/0259361 A1 | 11/2006 | Barhydt et al. | |
| 2006/0270478 A1* | 11/2006 | Barhydt et al. ................ | 463/41 |
| 2008/0034396 A1* | 2/2008 | Lev ................................ | 725/118 |
| 2008/0261635 A1* | 10/2008 | Samiri et al. .................. | 455/466 |
| 2010/0151819 A1* | 6/2010 | D'Englere ..................... | 455/406 |
| 2010/0222021 A1* | 9/2010 | Balsan et al. .................. | 455/406 |
| 2011/0119188 A1 | 5/2011 | Clayton et al. | |
| 2012/0231762 A1* | 9/2012 | Fortunatow .................... | 455/407 |

FOREIGN PATENT DOCUMENTS

| | | |
|---|---|---|
| EP | 1 959 651 A1 | 8/2008 |
| WO | WO 01/13298 A2 | 2/2001 |
| WO | WO 2005/053271 A2 | 6/2005 |

OTHER PUBLICATIONS

International Search Report for PCT/FI2012/050447 dated Aug. 23, 2012, pp. 1-5.
Written Opinion for PCT/FI2012/050447 dated Aug. 23, 2012, pp. 1-7.

(Continued)

*Primary Examiner* — Brandon Miller
(74) *Attorney, Agent, or Firm* — Ditthavong & Steiner, P.C.

(57) ABSTRACT

An approach is presented for handling incoming status messages with respect to a request and/or a communication channel (e.g., PSMS). A PSMS client causes, at least in part, a transmission of a request over a communication channel, the request originating from an application associated with a device. A status message client of the PSMS client causes, at least in part, a monitoring of one or more inboxes associated with the communication channel for one or more status messages related to the communication channel, the request, or a combination thereof. The status message client causes, at least in part, a presentation of a representation of at least a portion of the one or more status messages, status information interpreted from the one or more status messages, or a combination thereof in a user interface of the application.

20 Claims, 13 Drawing Sheets

(56) References Cited

OTHER PUBLICATIONS

"Opt in e-mail," Wikipedia, http://en.wikipedia.org/wiki/Opt_in_e-mail, accessed Aug. 3, 2011.

"SMS Message Regulations," Documentation Wiki, http://wiki.memberlandingpages.com/Mobile_Messages/SMS_Message_Regulations, accessed Aug. 3, 2011.

Extended European Search Report for corresponding European Application No. 12785590.6, dated Sep. 25, 2014, 6 pages.

* cited by examiner

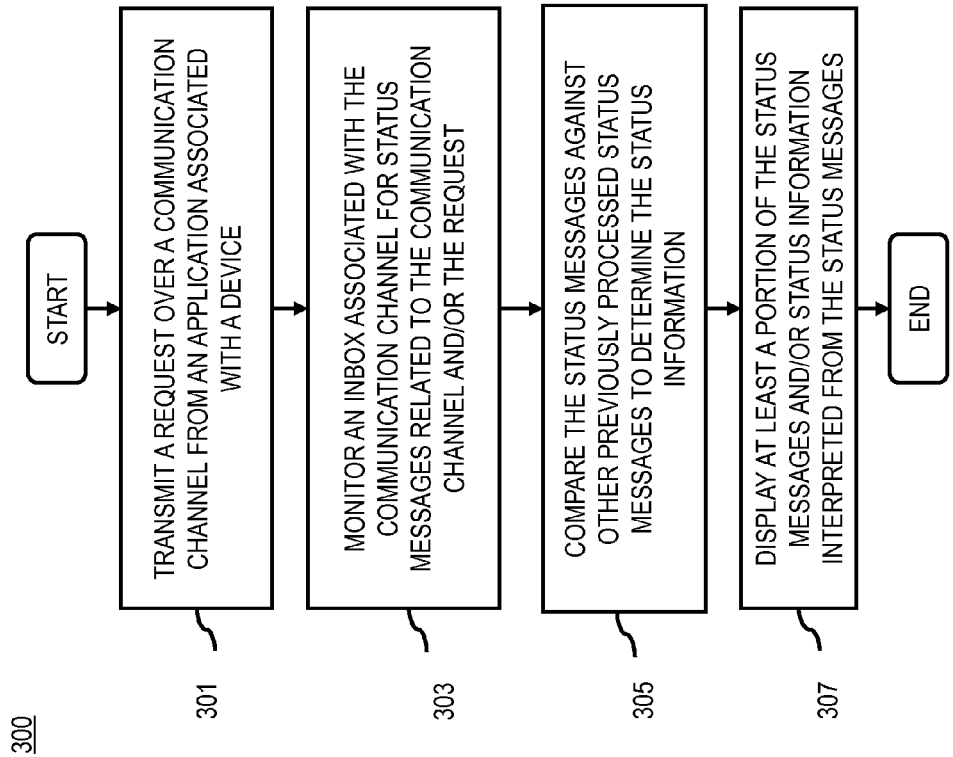

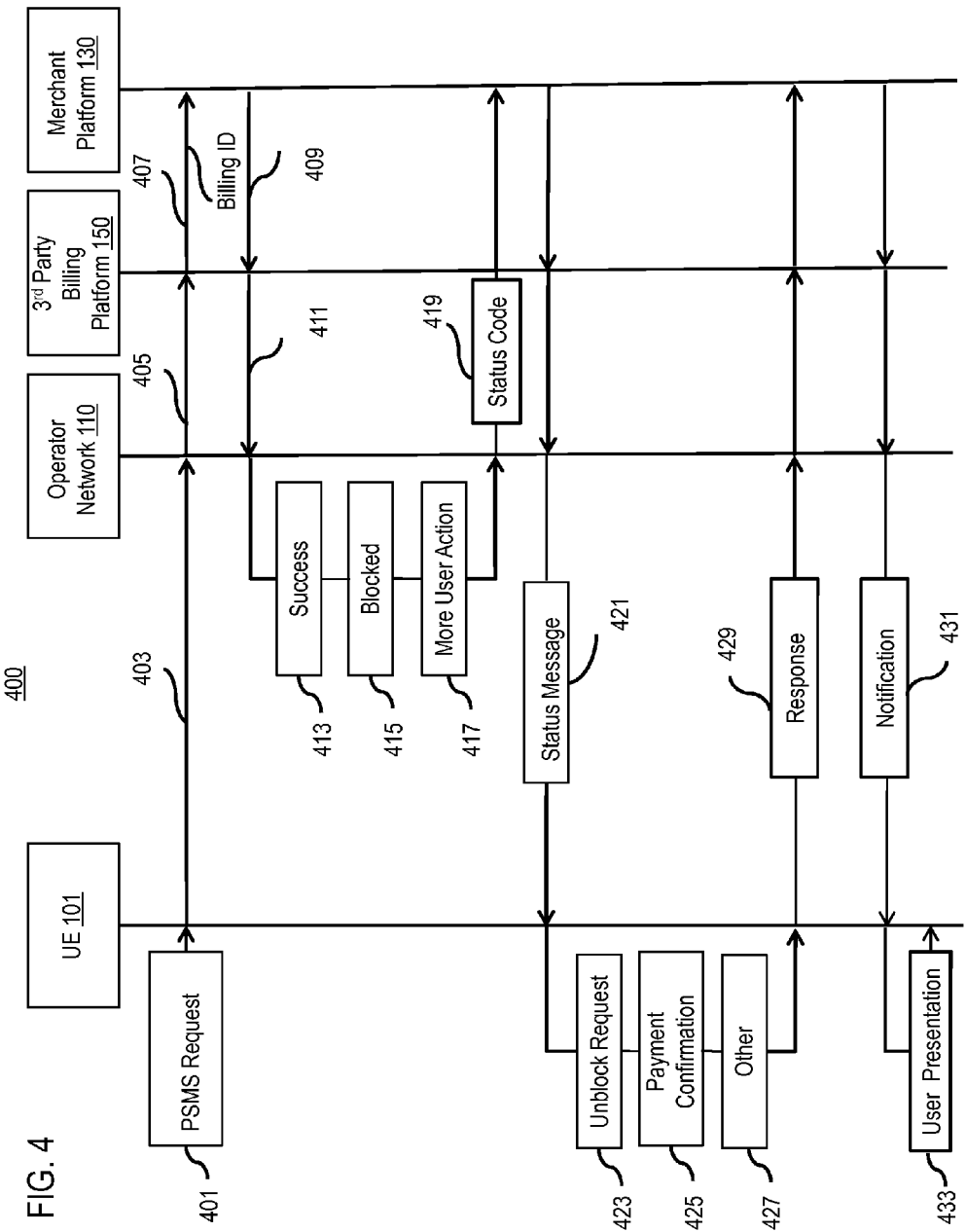

| STATUS CODE 501 | SHORT DESCRIPTION 503 | DETAILED DESCRIPTION 505 | USER ACTION 507 |
|---|---|---|---|
| 001 | USER ACCOUNT | USER INSUFFICIENT FUNDS | RECHARGE USER ACCOUNT |
| 002 | USER-SET BLOCK | BLOCK ALL PSMS | CONTACT OPERATOR TO REMOVE THE BLOCK |
| 003 | USER-SET BLOCK | BLOCK ALL PSMS ASSOCIATED WITH ONLINE GAMBLING FOR UNDERAGE USERS | REQUEST ADULT USER TO CONTACT OPERATOR TO REMOVE THE BLOCK |
| 004 | OPERATOR-SPECIFIC BLOCK | BLOCK ALL PSMS ASSOCIATED WITH CHILD PORNOGRAPHY | N/A |
| 005 | OPERATOR-SPECIFIC SUSPENSION | PAYMENT DOUBLE OPT-IN | REVIEW THE PRICE AND TRANSACTION TERMS /CONDITIONS THEN SELECT "AGREE" |
| 006 | COUNTRY-SPECIFIC BLOCK | BLOCK ALL PSMS ASSOCIATED WITH ADULT CONTENT | N/A |
| 007 | | | |
| 008 | | | |
| --- | | | |

METHOD AND APPARATUS FOR HANDLING INCOMING STATUS MESSAGES

BACKGROUND

Service providers and device manufacturers (e.g., wireless, cellular, etc.) are continually challenged to deliver value and convenience to consumers by, for example, providing compelling network devices and services. One area of development is premium communication channels, such as premium short message service (PSMS), for handling users' payments for products and/or services available over networks. For example, a user may download a ringtone, a wallpaper or logo to a mobile phone via PSMS services. PSMS is the most widely available payment channel that allows operators to charge subscribers. Subscribers are charged either when they send a short code text message (Mobile Originated or MO billing) or when they receive a message or response (Mobile Terminated or MT billing). PSMS revenues are shared by the server provider, the aggregator, the third party billing service provider, and the network operator. In most situations, PSMS messaging can be handled by a client application at the user device automatically and independently without any user interaction. However, when the SMS/PSMS message is blocked due to user-specific, operator-specific, and/or country-specific restrictions, the client application does not know how to handle different kinds of status messages with respect to the SMS/PSMS message. Accordingly, service providers and device manufacturers face significant challenges to facilitating the status message handling process in such environments.

SOME EXAMPLE EMBODIMENTS

Therefore, there is a need for an approach for handling incoming status messages with respect to a request and/or a communication channel. One example presented herein is a premium short message and handling incoming status messages with respect to the premium short message whether its status is success, blocked, or required further user action.

According to one embodiment, a method comprises causing, at least in part, a transmission of a request over a communication channel, the request originating from an application associated with a device. The method also comprises causing, at least in part, a monitoring of one or more inboxes associated with the communication channel for one or more status messages related to the communication channel, the request, or a combination thereof. The method further comprises causing, at least in part, a presentation of a representation of at least a portion of the one or more status messages, status information interpreted from the one or more status messages, or a combination thereof in a user interface of the application.

According to another embodiment, an apparatus comprises at least one processor, and at least one memory including computer program code for one or more programs, the at least one memory and the computer program code configured to, with the at least one processor, cause, at least in part, the apparatus to transmit a request over a communication channel, the request originating from an application associated with a device. The apparatus is also caused, at least in part, to monitor one or more inboxes associated with the communication channel for one or more status messages related to the communication channel, the request, or a combination thereof. The apparatus is further caused, at least in part, to present a representation of at least a portion of the one or more status messages, status information interpreted from the one or more status messages, or a combination thereof in a user interface of the application.

According to another embodiment, a computer-readable storage medium carries one or more sequences of one or more instructions which, when executed by one or more processors, cause, at least in part, an apparatus to transmit a request over a communication channel, the request originating from an application associated with a device. The apparatus is also caused, at least in part, to monitor one or more inboxes associated with the communication channel for one or more status messages related to the communication channel, the request, or a combination thereof. The apparatus is further caused, at least in part, to present a representation of at least a portion of the one or more status messages, status information interpreted from the one or more status messages, or a combination thereof in a user interface of the application.

According to another embodiment, an apparatus comprises means for causing, at least in part, a transmission of a request over a communication channel, the request originating from an application associated with a device. The apparatus also comprises means for causing, at least in part, a monitoring of one or more inboxes associated with the communication channel for one or more status messages related to the communication channel, the request, or a combination thereof. The apparatus further comprises means for causing, at least in part, a presentation of a representation of at least a portion of the one or more status messages, status information interpreted from the one or more status messages, or a combination thereof in a user interface of the application.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a client process for providing handling of incoming status messages with respect to a request and/or a communication channel, according to one embodiment;

FIG. 4 is a ladder diagram that illustrates a process that includes a sequence of messages and processes for handling incoming status messages with respect to a request and/or a communication channel, according to one embodiment;

FIG. 5 illustrates a status message table, according to one embodiment;

DESCRIPTION OF SOME EMBODIMENTS

Figure 1:
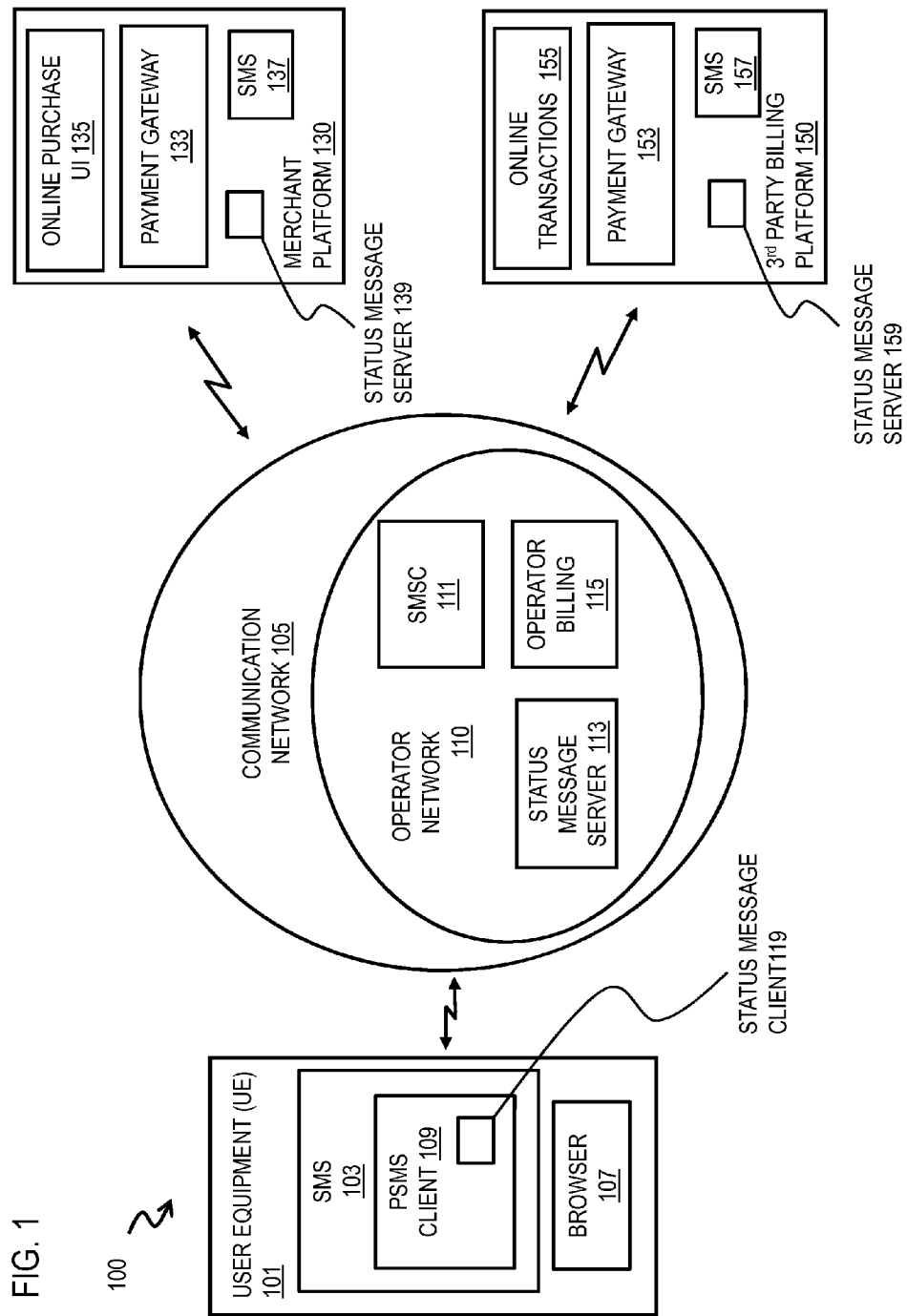
FIG. 1 is a diagram of a system handling incoming status messages with respect to a request and/or a communication channel, according to one embodiment.

Examples of a method, apparatus, and computer program are disclosed for providing handling of incoming status messages with respect to a request and/or a communication channel. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term operator refers to an operator of a communication network or portion thereof, including network and Internet, wired and wireless, service providers. A user refers to a person who connects to the operator's network, including a subscriber to the operator's communication network service, for example, a subscriber to a pre-paid, pre-arranged or invoiced subscription for network service. In a pre-paid subscription, charges are deducted from an amount the user has already paid to the operator. In a pre-arranged payment subscription, payments for accumulated charges are extracted with user permission automatically from one or more bank or credit accounts of the user on a regular schedule (e.g., monthly). In an invoiced subscription, the user is sent a written electronic or paper invoice describing resources provided and accumulated charges; and the user sends a payment in response to the written description. As used herein, a merchant is a commercial entity different from the provider that provides goods or services that are selected or delivered over the communication network to the user. As used herein, a network node (or simply node) is any wired or wireless device that is in communication with a communication network to originate or terminate messages or to relay messages.

Although various embodiments are described with respect to PSMS, it is contemplated that the approach described herein may be used with other communication channels with an inbox for handling users' incoming messages from operators. The communication channels may also handle users' payments, especially micro-payments, for products and/or services available over networks.

Although various embodiments are described with respect to a user connecting to the provider's network with a cell phone to purchase a product or service using operator billing, it is contemplated that the approach described herein may be used with other wired and wireless user equipment, such as laptop and desk top computers, personal digital assistants, and network appliances and during authentication relating to any product or service, not just for operator billing.

As described above, in direct operator billing, a merchant different from the network operator uses the network operator's billing system to extract payment from a user for a product or service ordered or delivered through the user's mobile or wired communication device, rather than duplicating functions to obtain and track payments from users. Typically, the merchant has a public site (called a front-end) on one or more nodes of the communication network where the user can view and select the merchant's products/services. In communications hidden from the user (called a back-end), the merchant's back-end system on the same or different nodes integrates with the operator billing system on one or more different nodes via an application programming interface (API).

PSMS billing is application-to-person (A2P) technology for businesses to bill their consumers using the communication channel. A PSMS message is a standard text message that is "wrapped" in an invoice. To charge the user for a product or service via PSMS, the merchant's back-end system authenticates a user to get a user identifier suitable for billing by the operator, such as a subscriber identifier for the user, also called a customer ID.

Customers may pay for a product or service (such as museum passes, bus/train tickets, parking meters, vending machine items, a ringtone, favorite celebrity wallpaper or logo, etc.) via PSMS, by making a phone call, sending a text message, or requesting via the Internet or data connection from the mobile device.

Common PSMS content restrictions include: unlawful, harmful, threading, defamatory, obscene, harassing, or racially, ethically or otherwise objectionable content. Additional PSMS content restrictions include services that facilitate illegal activity, promote violence, promote discrimination, promote illegal activities, or incorporate any materials that infringe or assist others to infringe on any copyright, trademark, or other intellectual property right. In some counties at this time, adult services are prohibited by all operators. The restrictions may be voluntarily enforced by operators. Most carriers in the United States restrict applying PSMS to provide adult services.

In addition, there some country-specific and/or operator-specific billing restrictions. For example, some countries and/or operators allow non-text content services after written confirmation or opt-in by the subscriber. On the other hand, other countries and/or operators require double confirmation or opt-in from the subscriber. In addition, a free and easily accessible method for opting out must be included. Optionally, a parental guidance service will send a warning advising consumers under 14 years of age not to use the PSMS without the permission of the account holder.

In a double opt-in process, after receiving an initial MO message, the operator sends out a non-premium confirmation request that invites the user to confirm acceptance of charge for the requested PSMS service with a second MO message. The confirmation request includes rate information and other disclosure. The customer is then billed when the second MO message is received by the operator. The customer will be charged at a normal rate for the first MO message, but the second MO message will be free of charge to the customer.

Most operators assist customers to set restrictions on the number of SMS/MMS messages and/or PSMS messages. The messages can be restricted per service provider, per content, per access code, per a daily/weekly/monthly/yearly maximum number/monetary value limit, etc. For example, the user specifies the number of PSMS messages per day or PSMS messages only to a short code. In addition, the user-set restrictions may involve the time of day, network traffic indication, pricing, subscriber account information (e.g., balance), etc. The premium services may be blocked on a SIM card of the user device or by the operator's back-end system. Sometimes, PSMS messages are blocked simply because the users do not have sufficient funds in their accounts to pay for the fees.

A customer can purchase these PSMS services from a content provider via an operator that will bill the customer's prepaid or post-pay account on behalf of the content provider. If the customer's cellular phone plan includes an SMS bundle, the MO messages will be deducted from the plan. If the user does not an SMS bundle, they will be charged a standard charge for an SMS MO message. Some operators charge customers a specified premium on MT messages. Customers will not be charged for non-premium messages. Some operators charge customers a specified premium plus a standard MT message charge, and only the standard MT message charge for non-premium messages.

Currently, an operator determines whether a user is blocked from sending and/or receiving a communication message (e.g., an SMS/PSMS message) based at least in part on the above-referenced restrictions. The operator then sends a status (e.g., success, error, further action required, etc.) message to the user device based on the determination. When the communication message is not blocked or does not require further user action (e.g., opt-in, double opt-in, etc.), the operator proceeds with the SMS/PSMS message to the provider, with or without sending a success status message. When the communication message is not blocked yet requires further user action, the operator suspends the SMS/PSMS message, and sends a status message to the user terminal indicating further user action is required. However, the status message does not trigger the required user action.

When the communication message is blocked, the operator skips the SMS/PSMS message, and sends an error message to the user terminal. However, the error message includes only a generic error code or an error code that may or may not specify a reason for the error, such as insufficient funds, blocked service, etc. In addition, if the client application associated with the communication channel (e.g., SMS/PSMS) is not activated when the error message arrives, the error message just sits in the user's inbox while the user has no idea that the communication message is blocked. The user may assume that the SMS/PSMS message went through, but is later disappointed because nothing further occurred in response to the user's SMS/PSMS message. This leads to poor user experience and operators' lost future transactions/revenues. These restrictions may be user-specific, operator-specific, and/or country-specific and may change over time. Therefore, it is challenging to provide client-side logic to handle the error messages to timely inform users the changing restrictions corresponding to the user's SMS/PSMS messages.

FIG. 1 is a diagram of a system 100 capable of handling incoming status messages with respect to a request and/or a communication channel, according to one embodiment. To address to the above-mentioned problems, the system 100 automatically detects all different kinds of premium services blocks by automatic polling of one or more inboxes for status messages, and informs a user accordingly. In one embodiment, status messages are collected and determined at the user device whether the user device is blocked from using certain premium services. In another embodiment, status messages are collected and sent to a back-end system for interpretation. The interpretation can be done by comparing against a database, or by analyzing each status message semantically. The accuracy of interpretation improves over time after collecting more data and sample messages or after the analyzing algorithm gets trained more.

By way of example, the system 100 automatically detects a double opt-in message in a payment flow by combining the client side logic and the back-end logic to vary payment logic according to various operator/country specific payment requirements. The system 100 then instructs the user to complete a payment confirmation process.

As such, the user is informed of a premium service block and/or a reason for the premium service block, such as the payment requires a double opt-in process. Since the user is informed clearly of the issues, the user's experience and trust of the system 100 is significantly improved. At the same time, the system 100 prompts additional user actions to facilitate unblocking the premium services, to complete the double opt-in process, thus increasing successful transactions and revenues via the premium services.

As shown in FIG. 1, the system 100 comprises user equipment (UE) 101 having connectivity to a merchant platform 130 and a third party billing platform 150 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof. At least a portion 110 of network 105 is under the administrative control of a network operator, and is called the operator network 110 herein.

The communication network 105 includes one or more access points (APs) for wireless devices, such as a non-WAP AP and a WAP AP, collectively called herein APs. One or more of these APs are in an operator network 110 portion of the communication network 105. WAP, well known in the art, is designed to transmit, over a wireless link, video and image content, such as web pages transmitted using HTTP and graphical user interfaces, to a wireless device, such as a cell phone, which has limited display screen area and possibly limited bandwidth. WAP is an open international standard that includes a protocol suite allowing the interoperability of WAP equipment and software with many different network technologies, thus allowing the building of a single platform for competing network technologies such as GSM and CDMA networks.

The operator network 110 also includes an SMS control system (SMSC) 111, a status message server 113, and an operator billing system 115. The SMSC 111 handles, stores and forwards short messages in a mobile telephone network. SMSC 111 uses protocols such as short message peer-to-peer (SMPP), universal computer protocol (UCP), OIS, computer interface to message distribution (CIMD), SMCI, etc.

The SMS is used to provide cell phone connection information in a mobile telephone network, but has come to be a popular way to send messages, primarily text, between end users for an application called text messaging. The SMS messages can be used between any pair devices that support SMS, such as any pair of third generation (3G) communication devices, in communication with the operator network 110 directly or indirectly through the communication network 105.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The merchant platform 130 is one or more network nodes that host applications that support the presentation, sale or delivery of products/services offered by the merchant, or some combination, generally referred to as e-commerce. The network nodes may be any external short messaging entity (ESME) that is an external application connecting to an SMSC to engage in the sending and/or receiving of SMS messages. Typical examples of ESMEs are systems that send automated marketing messages to mobile users, voting systems that process SMS votes, etc. Basically, anytime a mobile user sends or receives a message where the other party was not another real mobile user, it is likely that the other sender/receiver is an ESME. The front end processes of merchant platform 130 are represented by the online purchase user interface (UI) 135, and the backend processes of merchant platform 130 are represented by payment gateway 133. The merchant platform 130 also includes an SMS module 137. The SMS module 137 is used to compose, send, receive, store and display SMS messages (including PSMS messages) on merchant platform 130. SMS modules are well known in the art.

The third party billing platform 150 is one or more network nodes that host applications that facilitate transactions of products/services across operators, merchants, countries, or some combination. In particular, the third party has revenue share agreements and payment channels with various operators and merchants. The front end processes are represented by the online transaction interface 155, and the backend processes are represented by the payment gateway 153. The third party billing platform 150 also includes an SMS module 157. The SMS module 157 is used to compose, send, receive, store and display SMS messages (including PSMS messages) on the third party billing platform 150. In addition, the third party billing platform 150 delivers receipts, including handset notification, retry status messages, traffic reporting by country, operator, short code and service, etc. to the UE 101, the operator network 110, and/or the merchant platform 130. The third party billing platform 150 supports shared short codes for faster set-up time and lower costs. The third party billing platform 150 may provide guidance on local codes of practice and operator rules for launching premium services.

By way of example, the UE 101, merchant platform 130 and third party billing platform 150 communicate with each other, and with other components of the communication network 105, using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communication network is a World Wide Web client (called a "web browser," or simply "browser") that interacts through messages formatted according to the HyperText Transfer Protocol (HTTP) with any of a large number of servers called World Wide Web servers that provide web pages.

The UE 101 includes an SMS module 103 and a browser 107. The SMS module 103 is used to compose, send, receive, store and display SMS messages on the UE 101. The SMS module 103 includes a PSMS client 109 for handling PSMS messaging. Browsers and SMS modules are well known in the art. In the illustrated embodiment, the browser 107 includes a plug-in application or transient script that functions as a commercial client process for interacting with the online purchase UI 135 of merchant platform 130. The commercial client presents graphical elements from the online purchase UI 135 and captures and sends user actions, such as pointer moves and key strokes so that a user can navigate the products and initiate a purchase. Messages are exchanged between the commercial client on the UE 101 and the online purchase UI 135 on the merchant platform 130 using any application layer protocol, including HTTP among others. The online purchase UI 135 performs some functions of a commercial server for the merchant. In some embodiments, the commercial client is not part of a browser but is part of another application or is stand alone.

According to some embodiments, the PSMS client 109 on the UE 101 includes a status message client 139 that communicates with a status message server 113 on the operator network 110. The status message server 113 on the operator network 110 communicates with a status message server 139 on the merchant platform 130 and/or a status message server 159 on the third party billing platform 150, to retrieve a UE 101 ID and/or billing ID to determine whether a PSMS message from the UE 101 is either blocked or requires further user action.

According to some embodiments, the PSMS client 109 on the UE 101 includes an authentication client that communicates with an authentication server on the merchant platform 130. The authentication client determines whether an SMS message was authorized (using, for example, a security token). If not, the PSMS client 109 stops the processing.

Although nodes, modules and processors are shown in the illustrated embodiment as integral blocks in a particular arrangement for purposes of illustration, in other embodiments, one or more modules or processes, or portions thereof, are arranged in a different order on the same or different nodes, or the arrangement is changed in some combination of ways. By way of example, the status message server 113 may be included within the SMSC 111 or the operator billing system 115.

Figure 2:
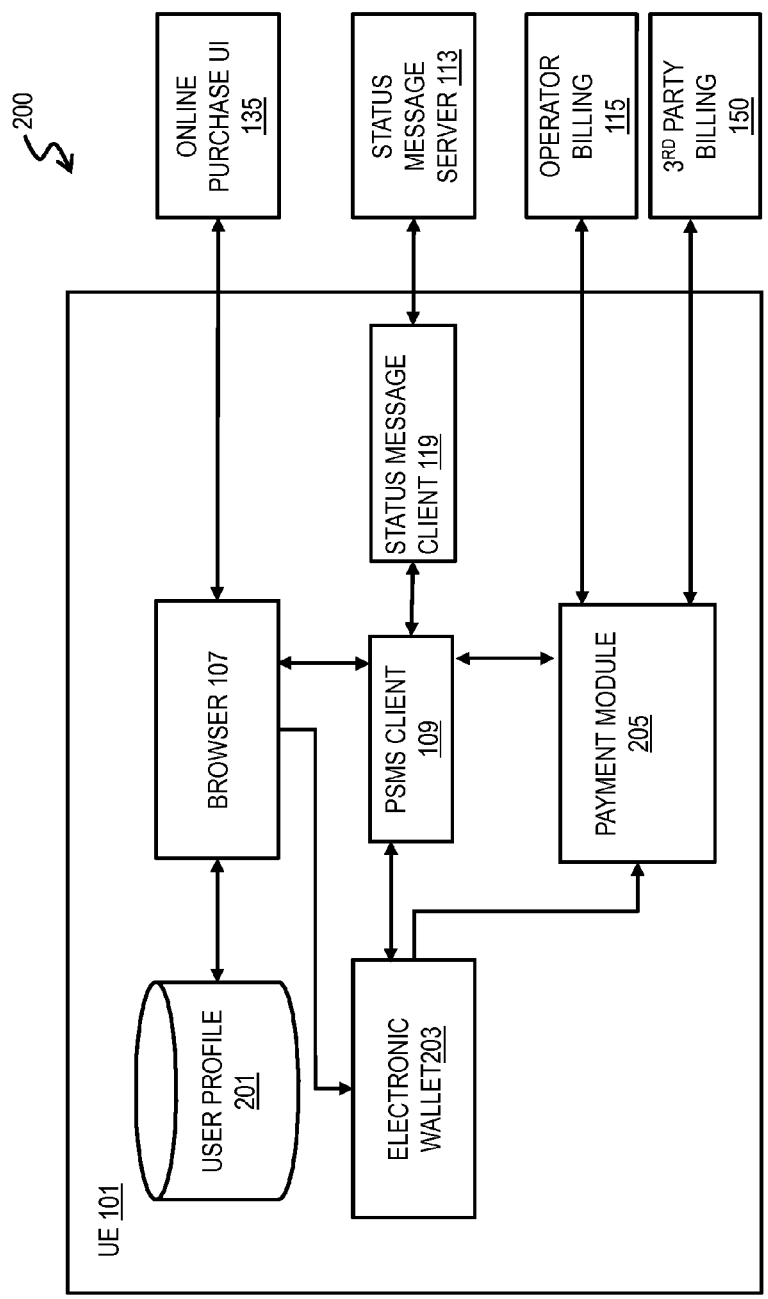
FIG. 2 is a diagram of the components of a user device for handling incoming status messages with respect to a request and/or a communication channel, according to one embodiment.

FIG. 2 is a diagram of the components 200 of the UE 101 for handling incoming status messages with respect to a request and/or a communication channel, according to one embodiment. By way of example, the merchant platform 130 includes one or more components for providing handling of incoming status messages with respect to a request and/or a communication channel. It is contemplated that the functions of these components may be combined in one or more components or performed by other components of equivalent functionality. One or more of these components are implemented on computer system 900, or chip set 1000 described in more detail below with reference to FIG. 9 and FIG. 10, respectively.

In the illustrated embodiment, the UE 101 includes the browser 107, a user profile database 201, the PSMS client 109, an electronic wallet 203, and a payment module 205. By way of example, the user activates the browser 107 to connect to the online purchase UI 135 of the merchant platform 103 and selects to purchase a game application. When the user specifies to pay for the transaction via conventional means such as a credit card, PayPal, a prepaid account, etc., the browser 107 interacts with the electronic wallet 203 to retrieve the user's online shopping information, e.g., logins, passwords, shipping address and credit card details, etc., prepares the information to the user, instructs payment module 205 to communicate with the operator billing system 115 and/or the third party billing platform 150 to deliver the payment.

When the user specifies to pay for the transaction via PSMS, the browser 107 interacts with the PSMS client 109 to generate a PSMS message that includes at least a short code associated with the product or service, and the UE 101 ID. The PSMS client 109 then transmits the PSMS message via the operator network 110 and the third party billing platform 150 to the merchant platform 130.

If the PSMS message is not blocked and it does not require further user action, the third party billing platform 150 will process the payment and the merchant platform 130 will notify the UE 101 that the PSMS message is processed for the transaction. According to the illustrated embodiment, the merchant platform 130 generates a transaction whereby a product/service and price is selected based on user input received through the online purchase UI 135. In some embodiments, a unique transaction identifier is defined and then used as an index for the third party billing platform 150 to process the billing and revenue splits.

If the PSMS message is blocked or requires further user action, the merchant platform 130 sends to the UE 101 a status message with respect to the PSMS message. As described in more detail below, the status message server 113 interacts with the status message client 119, the status message servers 139 and 159, and adds fields to certain sent messages and extracts fields from certain received messages to present status information to the user and/or to prompt the user to confirm payment for the PSMS billing.

Although processes, modules and data structures are shown as integral blocks in particular locations on certain nodes for purposes of illustration, in other embodiments, one or more processes, modules or data structures, or portions thereof, are arranged in a different order on the same or different network nodes. By way of example, the status message client 119 can be a module within the PSMS client 109, instead of a standalone application.

FIG. 3 is a flowchart of a client process 300 for providing handling of incoming status messages with respect to a request and/or a communication channel, according to one embodiment. In some embodiments, one or more steps of FIG. 3 are implemented in or initiated by, for instance, a chip set including a processor and a memory as shown FIG. 10. Although steps in FIG. 3 are shown in a particular order for purposes of illustration, in other embodiments, one or more steps may be performed in a different order or overlapping in time, in series or in parallel, or one or more steps may be omitted or added, or changed in some combination of ways.

In step 301, the PSMS client 109 transmits a request over a communication channel (e.g., SMS) from an application associated with a device (e.g., UE 101). In one embodiment, the request is related to payment information associated with the communication channel (e.g., PSMS). The request can contain a short code (e.g., 55555) in an SMS MAP MO-operation of the Short Message Service—Point to Point (SMS-PP) as defined in GSM recommendation 03.40. Short codes usually only work within one country, rather than internationally. The SMS message payload length is limited by the constraints of the signaling protocol to precisely 140 octets (140 octets=140*8 bits=1120 bits). Routing data and other metadata adds to the payload size. The SMS message may be sent through the short message peer-to-peer (SMPP) protocol, http protocol, etc.

The payment can be made for any products and/or services that are obtainable or accessible through the network. The products can be tangible products such as electronics, sporting goods, foods, paintings, collectibles, vehicles, real estate, plants, etc., or intangible products such as electronically available files of documents, music, movies, games, etc. The services can be used in a variety of contexts, such as healthcare, legal, financial, engineering consulting, human resources management, marketing, advertisement, banking, event planning, tour-guiding, travel-booking, tutoring, career-coaching, hairdressing, message, house cleaning, web café, trade and repair, wholesale, financial, legal, dining, transport and travel, mapping and navigation, parcel/vehicle tracking, weather services, games, etc.

The communication channel includes, at least in part, a premium messaging service as a form of payment. The one or more status messages (e.g., success, blocked, required further user action, etc.), the status information (e.g., user-specific restriction, insufficient fund, etc.), or a combination thereof relate, at least in part, to an availability of the premium messaging service over the communication channel (e.g., SMS blocks, PSMS blocks, etc.), one or more confirmation requests to use the premium messaging service (e.g., opt-in, double opt-in, etc.), one or more authentication requests to use the premium message service (e.g., the user is not authorized), or a combination thereof.

In step 303, the status message client 119 of the PSMS client 109 monitors an inbox associated with the communication channel for status messages related to the communication channel and/or the request. The monitoring occurs until a substantial completion of the request, an expiration of a predetermined time period, or a combination thereof.

In step 305, the status message client 119 compares the status messages against other previously processed status messages to determine the status information. The accumulation of the prior status messages in a status message database may take time to learn to recognize status message patterns and make intelligent decisions based on sufficient training data (machine learning). However, the matching against the database saves processing time and power. The comparison and/or the database are based, at least in part, on the one or more operators, when the status messages are operator specific. In one embodiment, the status message client 119 determines operators associated with the status messages, the other previously processed status messages, the status information, and/or the communication channel. By way of example, the status message client 119 compares the status message against configured double opt-in messages for an operator. They can be identified by a mobile country code (MCC), a mobile network code (MNC), etc. If the status message matches with a known double opt-in message, the status message client 119 determines a status code: double_opt_in_required.

In another embodiment, the status message client 119 processes the status messages for relating syntactic structures, from the levels of phrases, clauses, sentences and paragraphs to the level of the writing as a whole (semantic analysis) to determine the status information. The status information so interpreted requires more time and power, but not any database.

In step 307, the status message client 119 displays at the UE 101 at least a portion of the status messages and/or the status information interpreted from the status messages. The status message client 119 can customize the presentations based on user interests.

In another embodiment, the status message client 119 displays a prompt for one or more user actions based, at least in part, on the one or more status messages. The one or more user actions include, at least in part, making the communication channel available, fulfilling one or more requirements for confirming access to the communication channel, or a combination thereof.

SMS authentication can be used as an authentication mechanism. For example, a value of an IMSI identifier is read from a SIM card on the UE 101. In some embodiments, the IMSI value is included in the PSMS message, which preempts further authentication. If the short code that is used in the PSMS address field for SMS authentication is zero rated in an agreement with the operator, the PSMS client 109 can safely send PSMS messages without asking permission from the user and thus diminishing the user experience.

SMS text messaging is increasingly vulnerable to snooping, spoofing, and interception multiply. In one embodiment, the service request is encrypted since it contains confidential user information. In another embodiment, when accepting a transaction (e.g., 100 shares of stock) or an order for a service/product (e.g., a round-trip airline ticket to Europe), the service server encrypts a randomly-generated password and sends the encrypted password via an SMS message to the client device. The client device has to decrypt the encrypted password and then include the randomly-generated password in an SMS message to approve the transaction or order, and then sends the SMS message back to the service server. As such, users can use their cell phones to authenticate their transactions or orders through the service using SMS messaging.

To charge the user for a product or service via PSMS, the merchant's back-end system authenticates a user to get a user identifier suitable for billing by the operator, such as a subscriber identifier for the user, also called a customer ID. This customer ID can be Mobile Subscriber Integrated Services Digital Network Number (MSISDN), which is a cell telephone number) or some other identifier defined by the operator, such as an International Mobile Subscriber Identity (IMSI) identifier, an email address or Short Message Service (SMS) short code. IMSI is a unique 15-digit code used to identify an individual user on a global system for mobile communication (GSM) network. An IMSI value is typically stored on a Subscriber Identity Module (SIM card), a device used to store information in many mobile phones, especially for advanced features. The specifications for SIM cards are described in GSM 11.11. Beside FDN and SDN, SIM cards store an integrated circuit card identifier (ICCID), an international mobile subscriber identity (IMSI), an authentication key (Ki), a local area identity (LAI), an operator-specific emergency number, a short message service center (SMSC) number, a service provider name (SPN), an advice-of-charge parameters, value added service (VAS) applications, etc.

At least some functions of the status message client 119 can be implemented by the status message server 113 of the operator network 110 according to other embodiments. In these embodiments, the status message server 113 includes modules similar to those of the status message client 119, as previously described. To save time and battery, the status message client 119 can fetch user profile data and/or status messages/information cached or stored in the operator network 110, by requesting data from the status message server 113 or external platforms, such as the merchant platform 130 or the third party billing platform 150. Usually, if the UE 101 is online, data queries are made to online search server backends, and once the device is off-line, searches are made off-line locally to avoid data transmission costs. Alternatively, the status message client 119 can send a status message of interest to the status message server 113 and requests to the status message server 113 for performing the comparison.

FIG. 4 is a ladder diagram that illustrates a process 400 that includes a sequence of messages and processes for handling incoming status messages with respect to a request and/or a communication channel, according to one embodiment. FIG. 4 describes various embodiments of an incoming status messages handling mechanism based on, for example, PSMS for billing. The process 400 includes a device (e.g., a UE 101). In addition, the process 400 includes the operator network 110 that connects the UE 101 to a communication network 105, the merchant platform 130 and the third party billing platform 150. Although the example of FIG. 4 is described with respect to PSMS in a wireless network, various embodiments of the incoming status message handling process 400 of FIG. 4 can be applied to other network provisioning scenarios including a WiFi network, home network, etc.

At step 403, the UE 101 sends a PSMS message 401 (including a short code) to the SMSC 111 of the operator network 110. The PSMS message 401 is associated with a product or service. The product or service may involve applications, data, files, etc. and can be delivered in various forms of media (e.g., text, audio, video, 2D, 3D, multimedia, etc.). The product or service may include sweepstakes, alert services (breaking news, stock alerts, flight delay or cancellation, specific store/product/service price alerts, etc.), voting lines for television shows or competition lines, weather services, dating and chat services, psychic and horoscope lines, etc. The short code may be selected or entered by the user at the UE 101. The SMSC 111 may send an acknowledgement message back to the UE 101 to inform the UE 101 that the PSMS message was sent.

At step 405, the SMSC 111 sends a SMPP message (e.g., including the short code) to the third party billing platform 150, which then forwards the SMPP message to the merchant platform 130 in step 407. The merchant platform 130 then matches the UE 101 ID for a billing ID if the user has registered with the merchant (e.g., via the browse 107, or a prior transaction). At step 409, the merchant platform 130 sends an SMPP message (e.g., including the billing ID) to the third party billing platform 150, which then forwards the SMPP message to the status message server 113 of the operator network 110 in step 411.

In one embodiment, the registration data includes, at least in part, identity information of the client device, identity information of a user of the client device, a selection of a rate plan, account information, payment information, or a combination thereof. In another embodiment, the registration data includes personal identity of the device or user, a selection of a rate plan, a subscriber's contact information, a payment method (e.g., credit card), and the like. In yet another embodiment, the registration information is provided, at least in part, as one or more web-based standards (e.g., HTTP, HTTPS, JSON, JavaScript, XML, OMA DM managed objects (MOs), etc.).

The status message server 113 determines whether the billing ID and the respective short code are subject to any SMS or PSMS restrictions or require additional user action. Thereafter, the status message server 113 can determine whether the status of the PSMS message as "success" 413, "blocked" 415, or "required further user action" 417, and optionally, a status code ("002"). In one embodiment, the status message server 113 matches the billing ID and the respective short code against a list of restrictions. By way of example, Alice requests the operator to block all incoming and outgoing PSMS messages to avoid fees. Details of the status codes will be discussed in conjunction with FIG. 5 below.

The status message server 113 then sends a status code message to the status message server 139 of the merchant platform 130 at step 419. The status message server 139 generates an SMS message including the status code and sends the status message to the UE 101 at step 421. In one embodiment, the status message is sent to directly to the UE 101. In other embodiments, the status message passes via at least one of the third party billing platform 150 and the status message server 113. The messages among the status message servers 113, 139, 159 can be transmitted via data bearers such as SMS, USSD, GPRS, UMTS packet-radio service, or PPP on top of a circuit-switched data connection.

When receiving the status message, the status message client 119 of the UE 101 extracts the status code and determines what content to display at a user interface of the UE 101. The status message client 119 may display the status, a detailed description, user action, or a combination thereof. The use action falls in at least three categories: unblock request 423, payment confirmation 425, and other 427 (such as "no applicable action to take"). Continuing with Alice's example, the status message client 119 displays a detailed description ("Block all PSMS associated with online gambling for underage users") and user action ("Contact operator to remove the block") associated with the status code "002."

Once the user selects a user action, the status message client 119 generates a response including the user action, and sends the response to the status message server 113 of the operator network 110 at step 429. If the user request to unblock a PSMS message that can be handled by the operator, status message server 113 can either unblock the PSMS message, or remove the associated restriction based upon a default user preference. In another embodiment, the status message server 113 sends a query to the user to specify to unblock the PSMS message, or to remove the associated restriction. In yet another embodiment, the status message client 119 displays the query in conjunction with the status message before generating the response, thereby specifying unblocking only the PSMS message or all subsequent PSMS messages of the same nature in the response.

However, if the user action involves billing issues and requires the involvements of the third party billing platform 150 and/or the merchant platform 130, the status message server 113 forwards the response to be processed accordingly. By way of example, Alice's gift card does not have sufficient funds to download a new game, and requires recharging the gift card or selecting a different payment method/code. The status message server 113 forwards the response to be processed by the merchant platform 130.

After the response is processed, the status message server of the operator network 110, the third party billing platform 150, and/or the merchant platform 130 sends a notification to the status message client 119 of the UE 101 at step 431 to be presented to the user at step 433.

FIG. 5 illustrates a status message table, according to one embodiment. FIG. 5 describes various examples of status codes associated with, for example, PSMS for billing. The status table 500 includes a Status Code column 501, a Short Description column 503, a Detailed Description column 505, and a User Action column 507. By way of example, the status code 001 indicates a user account that has insufficient funds and requires recharging the funds of the user account. The status 002 indicates a User-set block that blocks all PSMS and requires contacting the operator to remove the block. The status code 003 indicates a User-set block that blocks all PSMS associated with online gambling for underage users and requires requesting an adult user to contact the operator to remove the block. The status code 004 indicates an Operator-specific block that blocks all PSMS associated with child pornography and there is no way to remove the block. The status code 005 indicates an Operator-specific suspension that requires payment double opt-in. The double opt-in involves displaying the price and transaction terms/conditions and then asking the user to select "Agree." The status code 006 indicates a country-specific block that blocks all PSMS associated with adult content and there is no way to remove the block.

Figure 6:
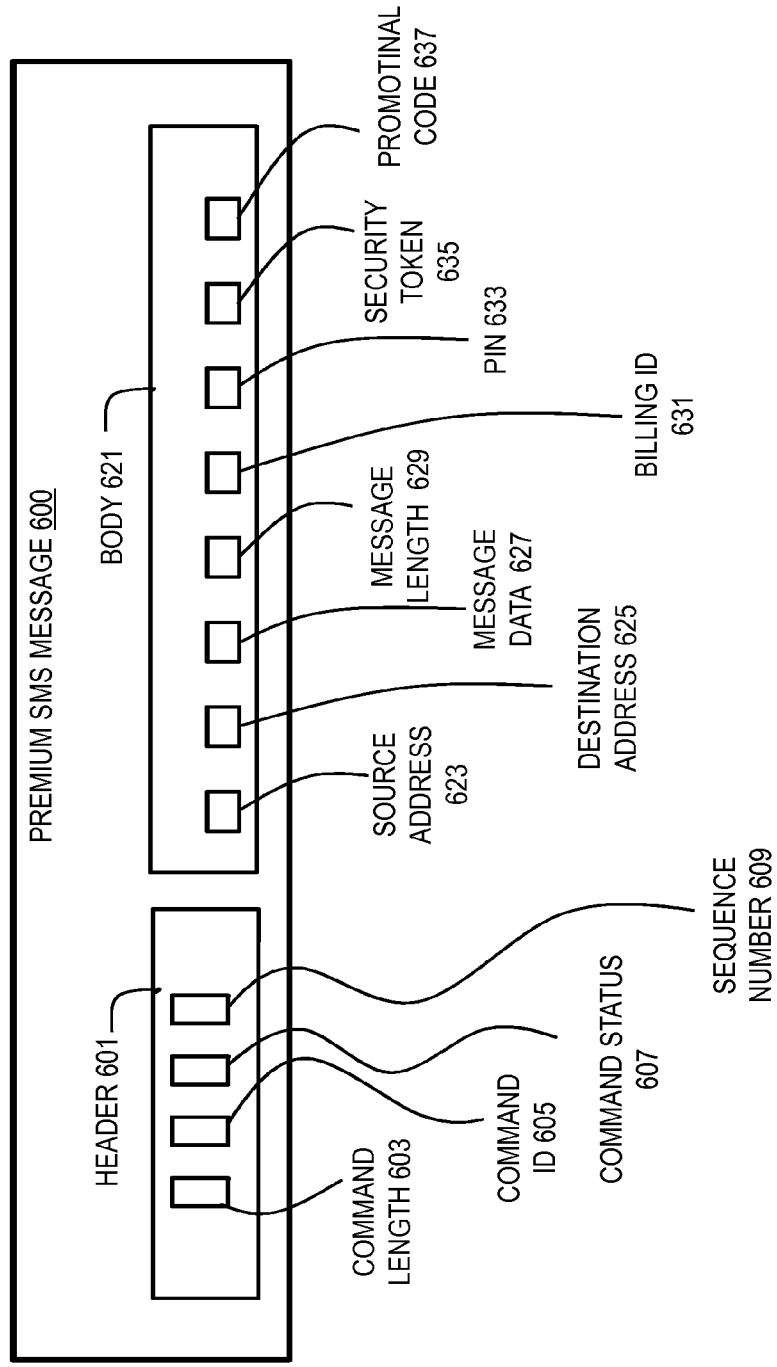
FIG. 6 is a diagram of a PSMS message sent from a user device to a SMS control system, according to one embodiment.

FIG. 6 is a diagram of a PSMS message 600 sent from the UE 101 to the SMSC 111, according to one embodiment. The PSMS message 600 includes a header 601 and a body 621. The header 601 is usually mandatory for SMS messages, and includes a command length 603, a command ID 605, a command status 607, and a sequence number 609. The command length 603 stores a number indicating the total size of the PSMS message 600. The command ID 605 indicates what particular command the PSMS message 600 may represent. The command status 607 may indicate a status code for the PSMS message 600 (e.g., success, blocked, further user action, etc.). The sequence number 609 may include a number for use in correlating or associating multiple PSMS messages.

SMS messages can be sent/received by a text mode or by a protocol description unit (PDU) mode. The text mode is an encoding of the bit stream represented by the PDU mode. The text mode may be unavailable on some user devices. When the UE 101 operates in different modes, the defined values for certain parameters are different. Usually, string values are defined for the text mode and numeric values are defined for the PDU mode. There are several encoding formats for displaying an SMS message: "PCCP437", "PCDN", "8859-1", "IRA", "GSM", etc. These can be set by the at-command AT+CSCS. When an application reads the message, it will choose a proper encoding. If the text mode is used, the application is limited by the set of preset encoding options. If the PDU mode is used, any encoding can be implemented. Although it is easier to use AT commands in the text mode, it supports fewer features of SMS messaging than the PDU mode.

By way of example, to send a PSMS message "Ringtone Tone 1" to a short code 55555. In the text mode, this is the command line:
AT+CMGS="+55555"<CR>Ringtone Tone1.<Ctrl+z>
In SMS PDU mode, executing the above command line will cause an error to occur.
To do the same task, the following command line should be used instead:
AT+CMGS=42<CR>0792000000F001158997E72E8000 3EC6D341EDF28922E7C1 E41EDF27C1E00006CDCB6E 328FE885EC6D3B91521 . . . <Ctrl+z>

The body 621 may be optional or mandatory, and its fields vary based on the command ID 605 indicated in the header 601. Typically, each command may identify its own fields for use in the body 621. By way of example, the body 621 includes for example, a source address field 623 (e.g., UE 101, SMSC 111, etc.), a destination address field 625 for PSMS message 600, a message data field 627, and a message length field 629. In this example the message length is "18," and the message is "Ringtone Tone 1." Optional fields that may be included are a billing ID field 631, a personal identification number (PIN) field 633, a security token field 635, a promotional code field 637, etc.

Although data messages and fields are depicted in FIG. 6 as integral blocks arranged in a particular order for purposes of illustration, in other embodiments, one or more messages or fields, or portions thereof are arranged in a different order or one or more other fields are included, or the message is changed in some combination of ways.

Figure 7B:
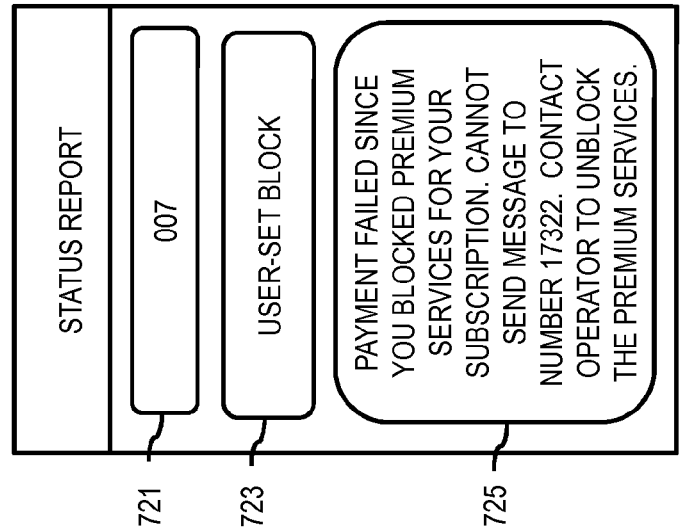
FIGS. 7A through 7D are diagrams of user interfaces utilized in the processes described with respect to FIGS. 3 and 4, according to various embodiments.
Figure 7A:
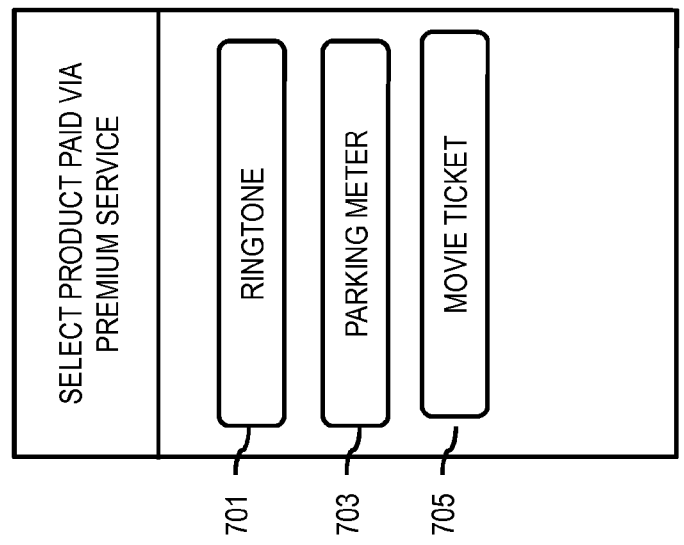
Figure 7D:
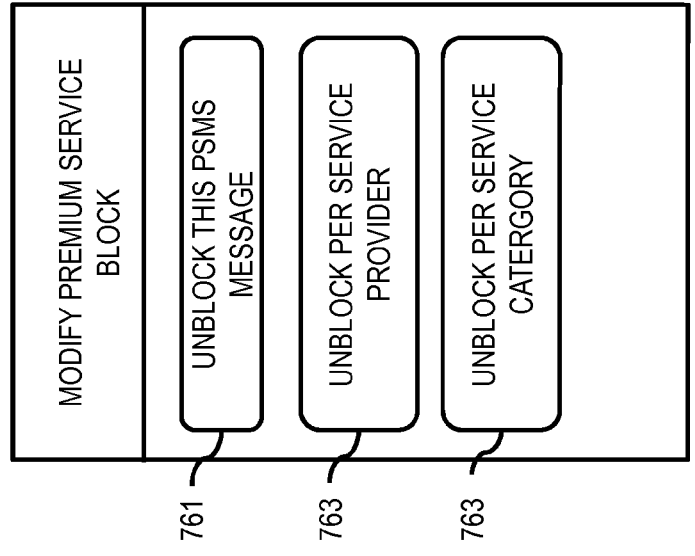

FIGS. 7A-7D are diagrams of user interfaces utilized in the processes described with respect to FIGS. 3 and 4, according to various embodiments. FIG. 7A depicts a user interface (UI) 700 that provides a list of products to be paid via premium services available to a UE 101 that is presenting or otherwise associated with the UI 700. As shown, the available premium services include Ringtone 701, Parking Meter 703, and Movie Ticket 705. In this example, the user selects to access the Movie Ticket 705. The PSMS client 109 sends a PSMS message to a short number (e.g. 17322) to purchase two movie tickets for a movie showing at a cinema in two hours. The SMSC 111 of the operator network 110 determines that the user has premium services blocked for this category (e.g., entertainment), the SMSC 111 rejects the billing and replies back with a status message that indicates that the operator network cannot send the PSMS message to number 17322.

After the PSMS message has been sent, the status message client 119 starts polling one or more Inboxes for incoming status messages with respect to the PSMS message. When a new status message is received, the status message client 119 interprets it locally or sends it to the status message server 113 of the operator network 110 for interpretation.

The status message is compared against a database of known PSMS block messages. When the status message is matched as a "user blocked premium service" message, a corresponding status/error code is provided. The status message client 119 then displays the status information in the UI 720 of FIG. 7B. As shown, the available user action options include Status Code 721, Detailed Description 723, and User Action 725. By way of example, the status message client 119 then displays the status code 007, a detailed description of the status "user-specific block," and the required user action: "Payment failed since you blocked premium services for your subscription. Cannot send message to number 17322. Contact operator to unblock the premium services."

Figure 7C:
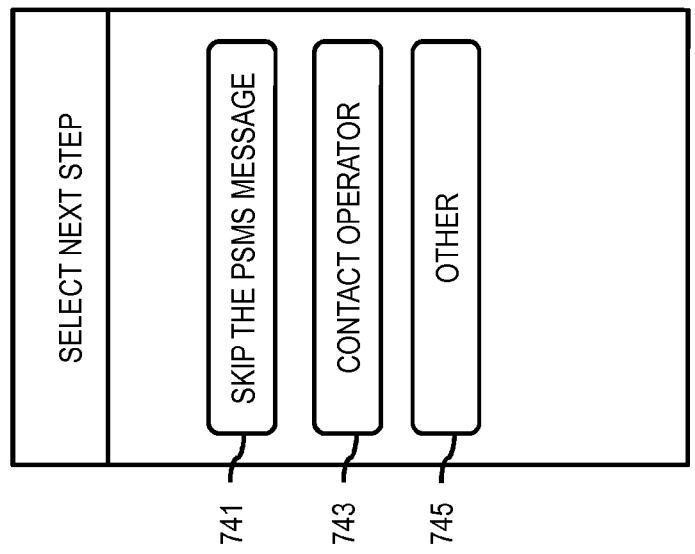

The status message client 119 then displays user action options in the UI 730 of FIG. 7C. As shown, the available user action options include Skip PSMS message 741, Contact Operator 743, and Other 745 (e.g., confirm payment). By way of example, the user selects Contact Operator 743. In response, the status message client 119 displays block modification options in the UI 740 of FIG. 7D. As shown, the block modification options include Unblock this PSMS Message 761, Unblock per Servicer Provider 763, and Unblock per Service Category 765. If the user selects Unblock this PSMS Message 761, only the PSMS message for movie tickets is unblocked. If the user selects Unblock per Servicer Provider 763, all premium services associated with the service provider of the PSMS message for movie tickets are unblocked. If the user selects Unblock per Service Category 765, all premium services associated with the category (e.g., food, clothes, housing, transportation, education, entertainment, hobbies, etc.) of the PSMS message for movie tickets are unblocked. Although in FIG. 7A through FIG. 7D data fields are depicted as integral blocks in a particular order in certain messages, in other embodiments, one or more fields, or portions thereof, may be arranged in a different order in the same or more or fewer messages.

Figure 8B:
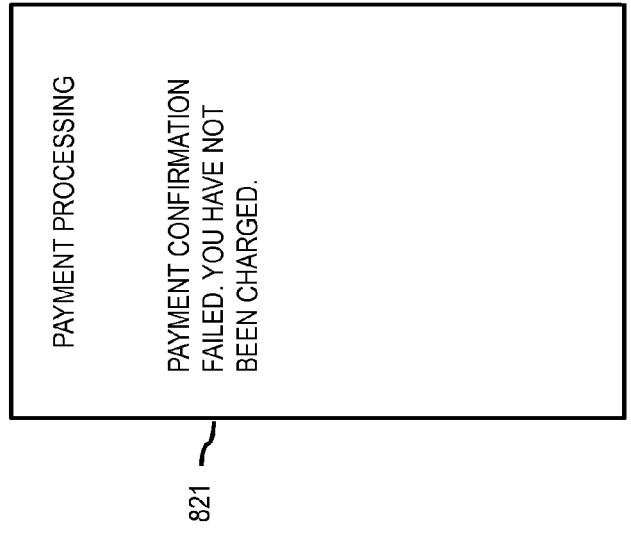
FIGS. 8A-8C are diagrams of user interfaces utilized in a double opt-out process, according to various embodiments.
Figure 8A:
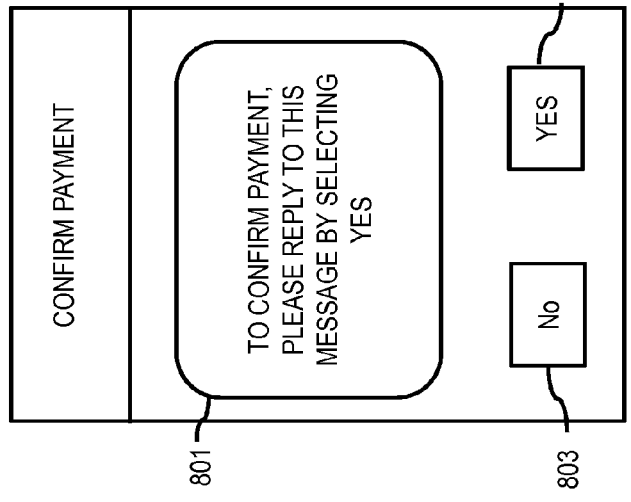
Figure 8C:
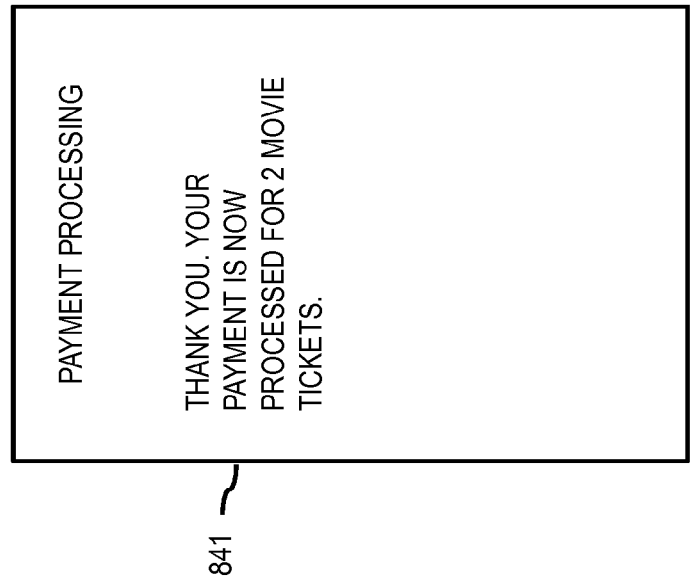

FIGS. 8A-8C are diagrams of user interfaces utilized in a double opt-out process, according to various embodiments. As mentioned, some operators require that a PSMS payment must be confirmed by the user by replying manually to a payment confirmation request sent by the operator. FIG. 8A depicts a UI 800 that displays a message 801: To confirm payment, please reply to this message by selecting YES, a No button 803, and a YES button 805.

When the user selects the NO button 803, the payment confirmation fails. FIG. 8B depicts a UI 820 that displays a message 821: "Payment confirmation failed. You have not been charged." When the user selects the YES button 805, the payment continues automatically: the user will get charged and can download the movie tickets. FIG. 8C depicts a UI 840 that displays a message 821: "Thank you. Your payment is now processed for 2 movie tickets." The status message server 113 of the operator network 110 handles the YES message and forwards it to the payment gateway of the merchant platform 130 and/or the third party billing platform 150 to charge the user's account.

In another embodiment, the user switches to the messaging Inbox and responds to the payment confirmation request according to instructions in FIG. 8A.

The processes described herein for handling incoming status messages with respect to a request and/or a communication channel may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
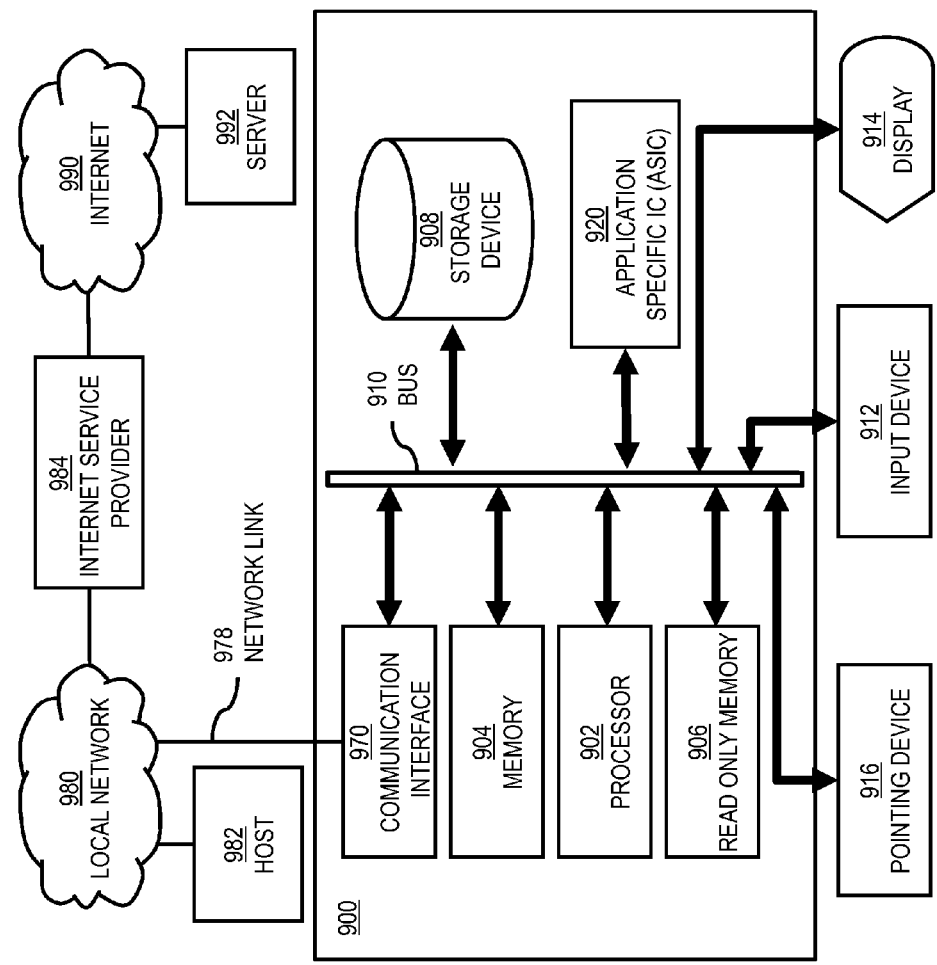
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to handle incoming status messages with respect to a request and/or a communication channel as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of handling incoming status messages with respect to a request and/or a communication channel.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to handle incoming status messages with respect to a request and/or a communication channel. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for handling incoming status messages with respect to a request and/or a communication channel. Dynamic memory allows information stored therein to be changed by the computer system 900.

RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for handling incoming status messages with respect to a request and/or a communication channel, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communication interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communication interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communication interface 970 may be a local area network (LAN) card to provide a data communication connection to a compatible LAN, such as Ethernet. Wireless links may also be implemented. For wireless links, the communication interface 970 sends or receives or both sends and receives electrical, acoustic or electromagnetic signals, including infrared and optical signals, that carry information streams, such as digital data. For example, in wireless handheld devices, such as mobile telephones like cell phones, the communication interface 970 includes a radio band electromagnetic transmitter and receiver called a radio transceiver. In certain embodiments, the communication interface 970 enables connection from UE 101 to communication network 105 for handling incoming status messages with respect to a request and/or a communication channel.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communication interface 970, carry information to and from computer system 900. Computer system 900 can send and receive information, including program code, through the networks 980, 990 among others, through network link 978 and communication interface 970. In an example using the Internet 990, a server host 992 transmits program code for a particular application, requested by a message sent from computer 900, through Internet 990, ISP equipment 984, local network 980 and communication interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communication interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
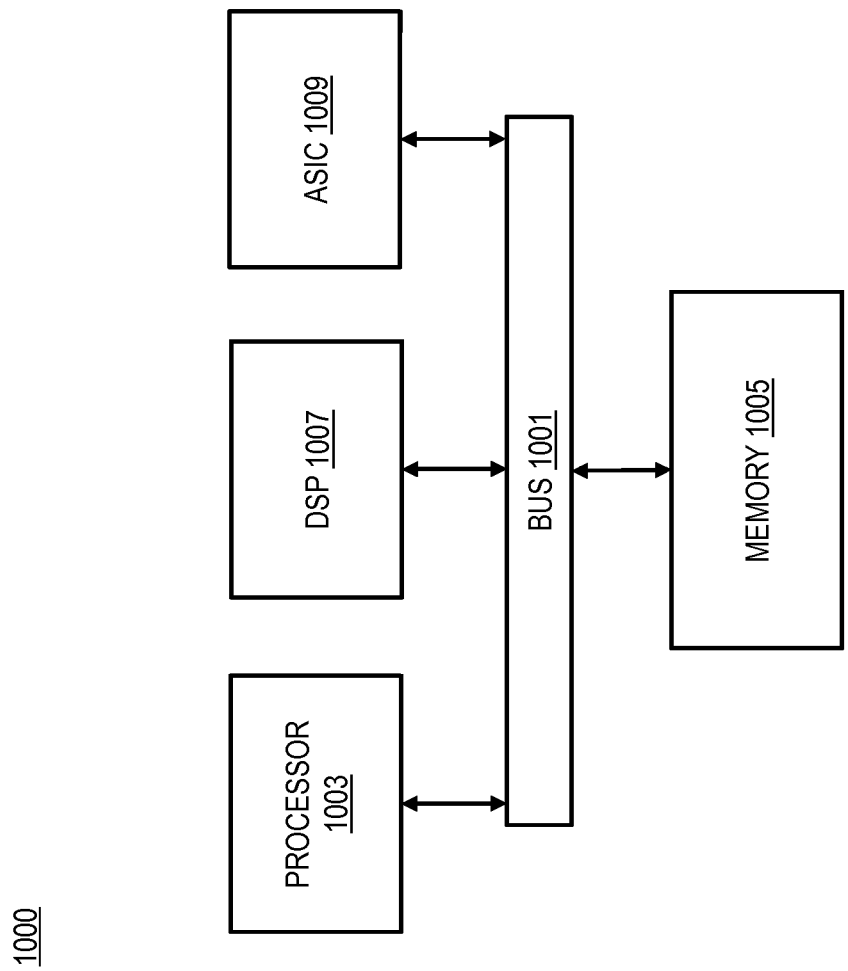
FIG. 10 is a diagram of a chip set that can be used to implement an embodiment of the invention.

FIG. 10 illustrates a chip set or chip 1000 upon which an embodiment of the invention may be implemented. Chip set 1000 is programmed to handle incoming status messages with respect to a request and/or a communication channel as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of handling incoming status messages with respect to a request and/or a communication channel.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to handle incoming status messages with respect to a request and/or a communication channel. The memory 1005 also stores the data associated with or generated by the execution of the inventive steps.

Figure 11:
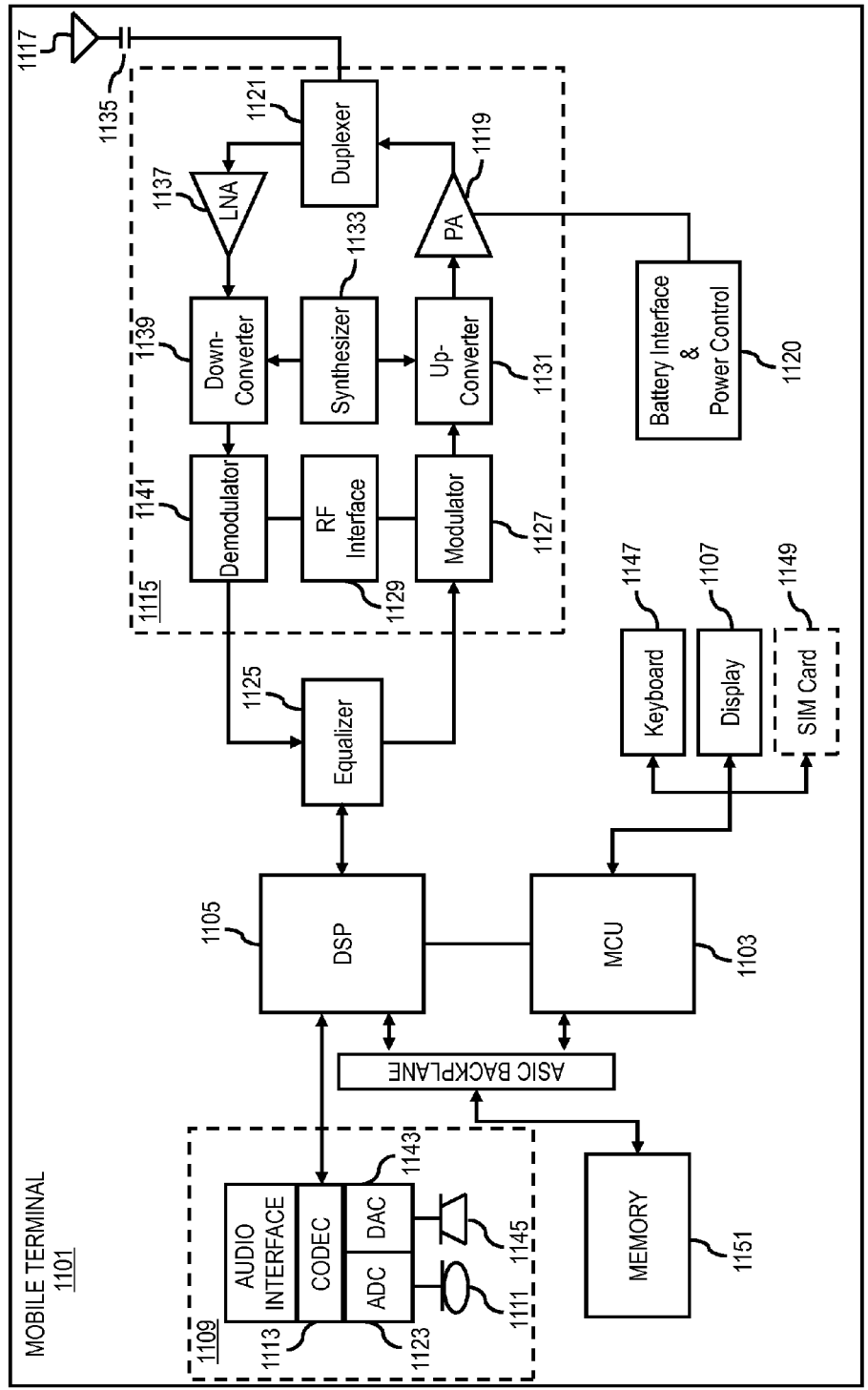
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of handling incoming status messages with respect to a request and/or a communication channel. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of handling incoming status messages with respect to a request and/or a communication channel. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to handle incoming status messages with respect to a request and/or a communication channel. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    transmitting a request over a communication channel, the request originating from an application associated with a device, the request being of a particular communication type;
    monitoring at the device of one or more inboxes associated with the communication channel for one or more status messages related to the communication channel, the request, or a combination thereof, wherein the one or more status messages are from a status message server of an operator network and the one or more status messages are not of the particular communication type; and
    presenting a representation of at least a portion of the one or more status messages, status information interpreted from the one or more status messages, or a combination thereof in a user interface of the application,
    wherein the status message server adds fields to certain sent messages and extracts fields from certain received messages to present the status information to the user.

2. A method of claim 1, wherein the request is related to payment information associated with the communication channel.

3. A method of claim 2, wherein the communication channel includes, at least in part, a premium messaging service as a form of payment.

4. A method of claim 2, wherein the one or more status messages, the status information, or a combination thereof relate, at least in part, to an availability of the premium messaging service over the communication channel, one or more confirmation requests to use the premium messaging service, one or more authentication requests to use the premium message service, or a combination thereof.

5. A method of claim 1, further comprising:
    processing of the one or more status messages to cause, at least in part, a comparison against at least one database of one or more other previously processed status messages to determine the status information.

6. A method of claim 5,
    wherein one or more operators are associated with the one or more status messages, the one or more other previously processed status messages, the status information, the communication channel, or a combination thereof, and
    wherein the comparison, the at least one database, or a combination thereof is based, at least in part, on the one or more operators.

7. A method of claim 1, further comprising:
    processing of the one or more status messages using, at least in part, a semantic analysis to determine the status information.

8. A method of claim 1, further comprising:
    a generation of a prompt for one or more user actions based, at least in part, on the one or more status messages.

9. A method of claim 8, wherein the one or more user actions include, at least in part, making the communication channel available, fulfilling one or more requirements for confirming access to the communication channel, or a combination thereof.

10. A method of claim 1, wherein the monitoring occurs until a substantial completion of the request, an expiration of a predetermined time period, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
    cause, at least in part, a transmission of a request over a communication channel, the request originating from an application associated with a device, the request being of a particular communication type;
    cause, at least in part, a monitoring at the device of one or more inboxes associated with the communication channel for one or more status messages related to the communication channel, the request, or a combination thereof, wherein the one or more status messages are from a status message server of an operator network and the one or more status messages are not of the particular communication type; and
    cause, at least in part, a presentation of a representation of at least a portion of the one or more status messages, status information interpreted from the one or more status messages, or a combination thereof in a user interface of the application,
    wherein the status message server adds fields to certain sent messages and extracts fields from certain received messages to present the status information to the user.

12. An apparatus of claim 11, wherein the request is related to payment information associated with the communication channel.

13. An apparatus of claim 12, wherein the communication channel includes, at least in part, a premium messaging service as a form of payment.

14. An apparatus of claim 12, wherein the one or more status messages, the status information, or a combination thereof relate, at least in part, to an availability of the premium messaging service over the communication channel, one or more confirmation requests to use the premium messaging service, one or more authentication requests to use the premium message service, or a combination thereof.

15. An apparatus of claim 11, wherein the apparatus is further caused to:
    process and/or facilitate a processing of the one or more status messages to cause, at least in part, a comparison against at least one database of one or more other previously processed status messages to determine the status information.

16. An apparatus of claim 15, wherein the apparatus is further caused to:
    determine one or more operators associated with the one or more status messages, the one or more other previously processed status messages, the status information, the communication channel, or a combination thereof, wherein the comparison, the at least one database, or a combination thereof is based, at least in part, on the one or more operators.

17. An apparatus of claim 11, wherein the apparatus is further caused to:
    process and/or facilitate a processing of the one or more status messages using, at least in part, a semantic analysis to determine the status information.

18. An apparatus of claim 11, wherein the apparatus is further caused to:
    cause, at least in part, a generation of a prompt for one or more user actions based, at least in part, on the one or more status messages.

19. An apparatus of claim 18, wherein the one or more user actions include, at least in part, making the communication channel available, fulfilling one or more requirements for confirming access to the communication channel, or a combination thereof.

20. An apparatus of claim 11, wherein the monitoring occurs until a substantial completion of the request, an expiration of a predetermined time period, or a combination thereof.

* * * * *